United States Patent [19]

Nguyen

[11] Patent Number: 6,151,483
[45] Date of Patent: Nov. 21, 2000

[54] METHOD AND DEVICE FOR MANAGEMENT OF BASE STATION RESOURCES

[75] Inventor: Cong Nguyen, Lynchburg, Va.

[73] Assignee: Ericsson Inc., Research Triangle Park, N.C.

[21] Appl. No.: 09/181,242

[22] Filed: Oct. 28, 1998

[51] Int. Cl.⁷ ................................................ H04B 17/00
[52] U.S. Cl. ...................... 455/67.1; 455/67.6; 455/424; 455/574
[58] Field of Search .................................. 455/9, 14, 15, 455/500, 522, 423, 424, 446, 447, 67.1, 67.6, 67.7, 560, 561, 574

[56] References Cited

U.S. PATENT DOCUMENTS

| | | | |
|---|---|---|---|
| 5,410,740 | 4/1995 | Hagström . | |
| 5,754,943 | 5/1998 | Arai et al. | 455/14 |
| 5,784,684 | 7/1998 | Van Wageningen et al. | 455/9 |
| 5,864,764 | 1/1999 | Thro et al. | 455/561 |
| 5,920,607 | 7/1999 | Berg | 379/1 |
| 5,923,247 | 7/1999 | Dowden et al. | 455/423 X |
| 5,970,394 | 10/1999 | Arpee et al. | 455/67.1 |
| 5,974,322 | 10/1999 | Carlsson et al. | 455/446 |

FOREIGN PATENT DOCUMENTS 0 287 305  4/1988  European Pat. Off. .

Primary Examiner—William G. Trost
Attorney, Agent, or Firm—Wood, Phillips, VanSanten, Clark & Mortimer

[57] ABSTRACT

An improved base station is provided for use in a wireless communication system, the wireless communication system including a control center supplying operating power to a plurality of base stations located at spaced distances therefrom, with each base station capable of transmitting signals on a select number of carriers at a select transmit power per carrier. The improved base station includes a controller automatically controlling the number of carriers utilized by the improved base station during transmission. Operating information associated with the improved base station is downloaded by the controller from the control center. The operating information includes a desired number of carriers to be utilized by the improved base station for transmission, a desired transmit power per carrier, and an actual spaced distance of the improved base station from the control center. The controller calculates an allowed spaced distance of the improved base station from the control center from the downloaded operating information. The calculated allowed spaced distance is defined as the distance where sufficient operating power reaches the improved base station to permit the improved base station to transmit on the desired number of carriers at the desired transmit power per carrier. The controller compares the actual spaced distance with the calculated allowed spaced distance, and reduces the number of desired base station carriers utilized by the improved base station for transmission at the desired transmit power per carrier if the actual spaced distance is greater than the calculated allowed spaced distance.

18 Claims, 2 Drawing Sheets

METHOD AND DEVICE FOR MANAGEMENT OF BASE STATION RESOURCES

FIELD OF THE INVENTION

The present invention is directed toward wireless communication systems and, more particularly, toward an improved base station capable of resource management.

BACKGROUND OF THE INVENTION

The use of base stations in wireless communication systems is generally well known. Base stations typically act as transfer points for communication with wireless communication devices, such as, but not limited to, cellular telephones. The typical base station is designed to transmit on a number of different carriers, or frequencies, at a maximum transmit power per carrier. This requires a certain amount of DC power input to the base station for transmission purposes.

Base stations typically receive power from a control center distally located from the base station. The DC power is supplied from the control center to the base station via a transmission cable connected therebetween. The inherent resistance of the cable dissipates some of the power supplied by the control center. As such, not all of the power supplied by the control center actually reaches the base station. The amount of power dissipated by the cable is directly proportional to the length of the cable.

Power dissipation in the transmission cable is a particular problem for base stations far removed from the control center. The base station may not receive enough power from the control center to transmit on its designed number of carriers at the maximum transmit power per carrier. As such, the base station will transmit on all carriers at a reduced power. This reduced power transmission may not be strong enough to reach the desired wireless communication device, or mobile station, thus causing breakdowns in the wireless communication system.

Further, should AC power be lost to the control center, due to a power outage, etc., the base station will operate in a battery backup mode, with the input power supplied by a battery in the control center.

Since the base station will transmit on all carriers at the maximum transmit power available by the battery, the operable life of the battery, and thus the base station, will be shortened.

The present invention is directed toward overcoming one or more of the above-mentioned problems.

SUMMARY OF THE INVENTION

An improved base station is provided for use in a wireless communication system, the wireless communication system including a control center supplying operating power to a plurality of base stations located at spaced distances therefrom, with each base station capable of transmitting signals on a select number of carriers at a select transmit power per carrier. The improved base station includes a controller automatically controlling the number of carriers utilized by the improved base station during transmission. Operating information associated with the improved base station is downloaded by the controller from the control center. The operating information includes a desired number of carriers to be utilized by the improved base station for transmission, a desired transmit power per carrier, and an actual spaced distance of the improved base station from the control center. The controller calculates an allowed spaced distance of the improved base station from the control center from the downloaded operating information. The calculated allowed spaced distance is defined as the distance where sufficient operating power reaches the improved base station to permit the improved base station to transmit on the desired number of carriers at the desired transmit power per carrier. The controller compares the actual spaced distance with the calculated allowed spaced distance, and reduces the number of desired base station carriers utilized by the improved base station for transmission at the desired transmit power per carrier if the actual spaced distance is greater than the calculated allowed spaced distance.

The operating information associated with the improved base station is typically downloaded by the controller from the control center at base station power-up.

The desired number of base station carriers may be a maximum number of carriers utilizable by the improved base station for transmission. Similarly, the desired transmit power per carrier may be the maximum transmit power per carrier utilizable by the improved base station for transmission.

Operating power is generally supplied to the improved base from the control center via a cable connecting the improved base station and the control center. Operating power attention results from power dissipation in the cable.

In a second embodiment of the improved base station, the control center operates in a battery backup mode. The controller continuously monitors the DC operating voltage input to the improved base station and calculates an allowed number of carriers operable at a select transmit power per carrier based on the monitored DC operating voltage. The controller orders the improved base station to transmit on a reduced number of carriers at the select transmit power per carrier, with the reduced number of carriers less than the calculated allowed number of carriers. Thus, battery life is extended.

It is an object of the present invention to control the power consumed by a base station during transmission.

It is a further object of the present invention to extend battery life.

It is yet a further object of the present invention to lengthen the distance between the control center and the base station while still transmitting at maximum power per carrier.

Other aspects, objects and advantages of the present invention can be obtained from a study of the application, the drawings, and the appended claims.

DETAILED DESCRIPTION OF THE PREFERRED EMBODIMENT

Figure 1:
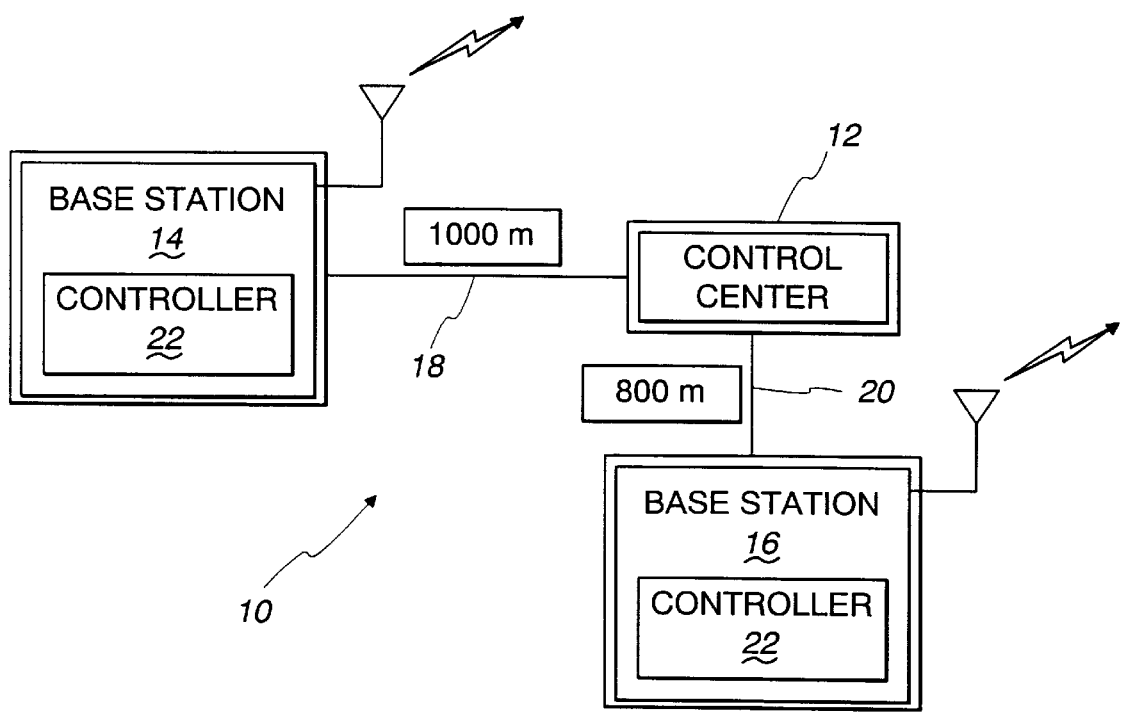
FIG. 1 is a block diagram illustrating a control center and two base stations utilized in a wireless communication system according to the present invention.

A wireless communication system, shown generally at 10, is illustrated in FIG. 1. The wireless communication system 10 includes a control center 12 and a plurality of base stations, with base stations 14 and 16 illustrated in FIG. 1. The control center 12 supplies DC operating power to the base stations 14 and 16 via cables 18 and 20, respectively.

The base stations 14,16 transmit and receive communication signals to and from various mobile communication devices (not shown) within designated geographic areas.

Base stations 14 and 16 are designed to transmit signals on a maximum number of carriers, or frequencies, at a maximum transmit power per carrier. Typically, the base stations 14 and 16 are designed to transmit on a maximum of five (5) carriers at a maximum transmit power of 10 mW per carrier. Of course, a base station may be configured to transmit on a less number of carriers if desired. When transmitting on the maximum number of carriers (5) at maximum power per carrier (10 mW), the typical DC power consumption of a base station is 15 W. This power is supplied to the base stations 14 and 16 by a power source (not shown) located in the control center 12, via transmission cables 18 and 20, respectively.

Generally, some of the power supplied by the control center 12 will be dissipated in the cables 18 and 20. The amount of power dissipated by the cables 18 and 20, which is directly proportional to their length, limits the distance that the base stations 14 and 16 may be located from the control center 12. Other factors limiting this distance are the size of the power supply in the control center 12, and the number of carriers and the transmit power per carrier on which the base stations 14 and 16 are configured to transmit. For example, if the base stations 14 and 16 are configured to transmit on the maximum number of carriers (5) at the maximum transmit power per carrier (10 mW), then the maximum distance between the control center 12, utilizing a typical power supply, and the respective base station 14,16 is 800 meters. At 800 meters, the base stations 14 and 16 will still receive enough DC power, after taking into account the power dissipated by the cables 18 and 20 to transmit on the maximum number of carriers (5) at the maximum transmit power per carrier (10 mW).

Base station 16, which is located 800 m from the control center 12, will receive enough DC power from the control center 12, to transmit on the maximum number of carriers (5) at the maximum transmit power per carrier (10 mW). On the other hand, base station 14, which is located 1000 m from the control center 12, will not receive enough DC power from the control center 12, due to the ohmic loss, i.e., power dissipation, associated with the cable 18, to transmit on the maximum number of carriers (5) at the maximum transmitter power per carrier (10 mW). A prior art base station would simply transmit on the maximum number of carriers at a reduced transmit power per carrier. The reduced transmit power per carrier may not be sufficient for transmission to the various mobile stations located within the geographical area serviced by that particular base station. Accordingly, base stations 14 and 16 each include a controller 22 which controls the base station 14,16 to transmit on a reduced number of carriers at the maximum transmit power per carrier if the base station 14,16 is located beyond an allowable distance from the control center 12. The allowable distance is defined as the maximum distance between the base station 14,16 and the controller 12 where the base station 14,16 will still receive sufficient operating power to transmit on the maximum number of carriers at the maximum transmit power per carrier.

Figure 2:
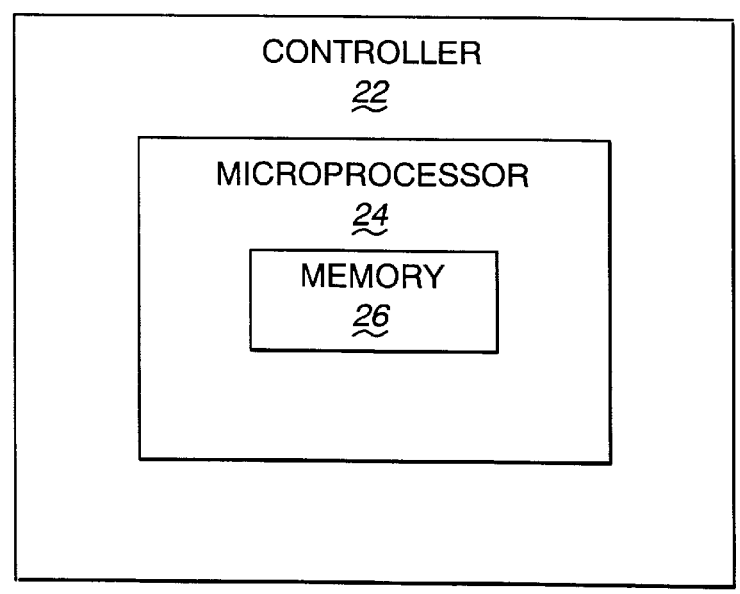
FIG. 2 is a block diagram of the controller included in each of the base stations shown in FIG. 1.

An expanded view of the controller 22 is shown in FIG. 2. The controller 22 includes a microprocessor 24 having a memory 26. The microprocessor 24 controls the operation of the controller 22 in controlling the number of carriers activated to transmit signals at a particular base station. The information utilized by the microprocessor 24 in determining the number of carriers to activate is stored in and read from the memory 26.

Figure 3:
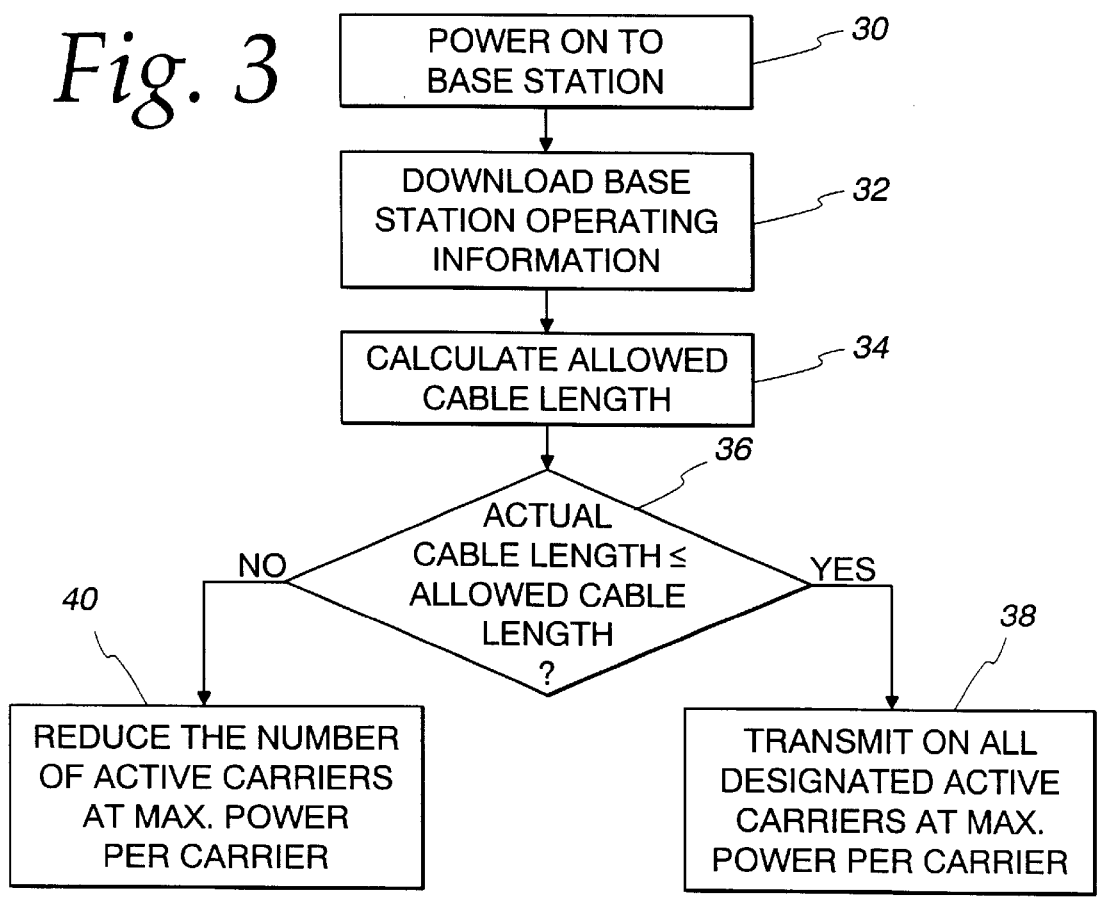
FIG. 3 is a flow chart illustrating operation of the controller in determining the number of allowed carriers at maximum power per carrier.

The operation of the controller 22 in controlling the base stations 14 and 16 for transmission, will now be described with respect to FIGS. 1–2 and the flow chart of FIG. 3. Upon power being turned on to the respective base station, at block 30, the controller 22, via microprocessor 24, downloads operating information associated with the respective base station 14,16 from the control center 12, at block 32. The operating information is stored in memory 26 and generally includes information such as the frequency band on which the base station is to operate (typically 800 MHZ or 1900 MHz), the number of carriers to be utilized by the base station for transmission, i.e., designated active carriers (typically this is the maximum number of carriers utilizable by the base station), the maximum transmitter power per carrier, and the actual physical distance between the respective base station 14,16 and the control center 12. The distance between the base station 14,16 and the control center 12 will be the same as the length of the cable 18,20 connected respectively therebetween.

The microprocessor 24 then calculates an allowed cable length, at block 34, based on the operational information of the respective base station 14,16, namely, the number of designated active carriers and the transmit power per carrier. The microprocessor 24 compares, at block 36, the calculated allowed cable length of the respective base station 14,16 with the actual cable length downloaded from the control center 12.

If the actual cable length is less than, or equal to, the allowed cable length, the controller 22 controls the base station 14,16, at block 38, to transmit on all designated active carriers at maximum power per carrier, if desired. If the actual cable length is greater than the allowed cable length, the controller 22 controls the base station 14,16 to reduce the number of active carriers at the respective base station 14,16, at block 40, thus allowing the reduced number of active carriers to transmit at maximum power per carrier.

More specifically, the controller 22 in each base station 14 and 16 operates as follows. Assume base station 16 is configured to transmit on five (5) active carriers (the maximum allowable) at 10 mW per active carrier (the maximum allowable). Upon power on to the base station 16 (block 30), the controller 22 downloads the above information, along with the frequency band and the 800 meter length of cable 20, from the control center 12 (block 32). The controller 22 calculates the allowed cable length (block 34), which in the case of five (5) active carriers at 10 mW per carrier is 800 meters. The controller 22 compares the actual cable length (800 meters) with the calculated allowed cable length (800 meters) (block 36), and determines that the base station 16 can transmit on all active carriers at maximum power per carrier (block 38).

Similarly, assume that base station 14 is configured to transmit on five (5) active carriers (the maximum allowable), at 10 mW per active carrier (the maximum allowable). Upon power on to the base station 14 (block 30), the controller 22 downloads the above information, along with the frequency band and the 1000 meter length of cable 18, from the control center 12 (block 32). The controller 22 calculates the allowed cable length (block 34), which in the case of five (5) active carriers at 10 mW per carrier is 800 meters. The controller 22 compares the actual cable length (1000 meters) with the calculated allowed cable length (800 meters) (block 36). Since the actual cable length is greater than the calculated allowed cable length, the controller 22 controls the base station 14 to transmit on a reduced number of carriers, for example three (3) carriers, at the maximum power of 10 mW per carrier (block 40). The reduced number of carriers is calculated by the microprocessor 24 and is essentially the number of carriers utilizable by the base station at the maximum, or designated, power per carrier taking into account the power loss due to the extra length of cable (actual length minus allowed length). Thus, the base station 14 will continue to transmit at maximum power per carrier, albeit on a lesser number of carriers. This helps to ensure that transmissions by the base station 14 are received at the various mobile stations (not shown) within the geographical area serviced by the base station 14.

Figure 4:
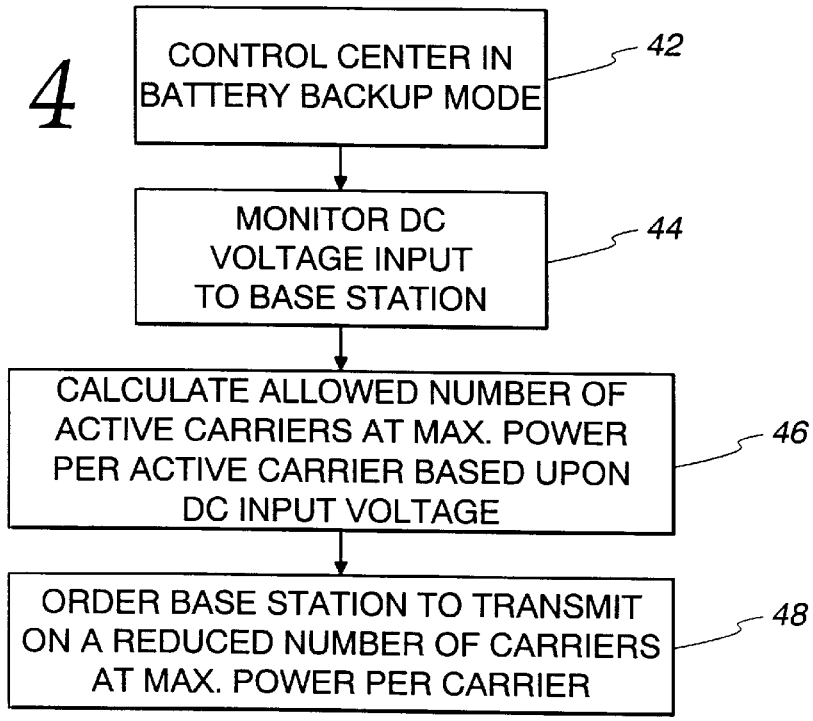
FIG. 4 is a flow chart illustrating operation of the controller in battery backup mode.

FIG. 4 illustrates operation of the controller 22 should AC power be lost at the control center 12. When AC power is lost at the control center 12, the control center 12 operates from a battery backup mode, the battery (not shown) being located physically at the control center 12. Since the battery located at the control center 12 can only supply a limited amount of power for a limited amount of time, the operational life of the base stations 14 and 16 are thereby jeopardized. Accordingly, the controller 22 will automatically reduce the number of active carriers at the respective base stations 14 and 16, thus reducing the amount of power consumed by the base stations 14 and 16 and extending battery life. Specifically, operation of the controller 22 is as follows.

The controller 22 senses that the control center 12 has switched to a battery backup mode, at block 42. Accordingly, each base station 14 and 16 is now operating in a battery backup mode and is still fed operational power from the control center 12. The controller 22 continuously monitors, at block 44, the DC voltage input to the respective base station 14,16. This DC voltage is supplied by the battery (not shown) in the control center 12 via the cable 18,20 linking the base station 14,16 to the control center 12. The controller 22 calculates the allowed number of active carriers at maximum transmit power per carrier utilizable at each base station 14,16 based upon the DC voltage input to the respective base station 14,16 at block 46. The controller 22 then orders the base station 14,16, at block 48, to transmit at a reduced number of active carriers, less than the calculated allowed number of active carriers, at the maximum transmit power per carrier. This aids in extending battery life since power consumption is limited at each base station 14,16.

For example, referring to FIG. 1, the controller 22 in each of the base stations 14 and 16 senses that the control center 12 operating in a battery backup mode (block 42), continuously monitors the available DC voltage input to each base station 14 and 16 (block 44); the DC voltage supplied by the battery (not shown) in the control center 12 via cables 18 and 20, respectively.

The controller 22 at base stations 14 and 16 calculates, based upon the monitored DC voltage, the allowed number of active carriers utilizable by the respective base station 14,16 at maximum power per carrier (block 46). The controller 22 then orders the base station 14,16 to transmit on a reduced number of active carriers (block 48), the reduced number of active carriers being less than the calculated allowed number of active carriers. In this manner, battery life, base station life, and thus the operability of the wireless communication system as a whole is extended.

Since the base station 14 is spaced further from the control center 12 than base station 16, base station 14 should receive less DC input voltage than base station 16 due to more power being dissipated in cable 18 (1000 m) than cable 20 (800 m). Thus, the number of active carriers at maximum power per carrier utilizable by base station 14 should be less than, or possibly equal to, that utilizable by base station 16, depending, of course, on the spaced distance between the respective base station 14,16 and the control center 12.

While the invention has been described with particular reference to the drawings, it should be understood that various modifications could be made without departing from the spirit and scope of the present invention.

What is claimed is:

1. In a wireless communication system including a base station capable of transmitting signals on a select number of carriers at a select transmit power per carrier, said base station receiving operating power from a control center located a spaced distance therefrom, a method of automatically controlling the number of carriers utilized by the base station during transmission, said method comprising the steps of:

providing operating information associated with the base station, said operating information including a desired number of carriers to be utilized by the base station for transmission, a desired transmit power per carrier, and an actual spaced distance of the base station from the control center;

calculating an allowed spaced distance of the base station from the control center from said operating information, said calculated allowed spaced distance being a distance where sufficient operating power reaches the base station to permit the base station to transmit on the desired number of carriers at the desired transmit power per carrier;

comparing the actual spaced distance with the calculated allowed spaced distance;

activating the desired number of base station carriers at the desired transmit power per carrier if the actual spaced distance is less than, or equal to, the calculated allowed spaced distance; and activating a reduced number of base station carriers at the desired transmit power per carrier if the actual spaced distance is greater than the calculated allowed spaced distance, said reduced number of base station carriers being less than said desired number of base station carriers.

2. The method of claim 1, wherein the step of providing operating information associated with the base station comprises the step of downloading said operating information from the control center to a controller in the base station.

3. The method of claim 2, wherein said downloading step is performed at base station power-up.

4. The method of claim 1, wherein the desired number of base station carriers is a maximum number of carriers utilizable by the base station for transmission.

5. The method of claim 1, wherein the desired transmit power per carrier is a maximum transmit power per carrier utilizable by the base station for transmission.

6. The method of claim 1, wherein the operating power is supplied to the base station from the control center via a cable connecting the base station and the control center, and wherein operating power attenuation results from power dissipation in the cable.

7. In a wireless communication system including a base station capable of transmitting signals on a select number of carriers at a select transmit power per carrier, said base station receiving operating power from a control center located a spaced distance therefrom, a method of automatically controlling the number of carriers utilized by the base station during transmission, said method comprising the steps of:

provide operating information associated with the base station, said operating information including a desired number of carriers to be utilized by the base station for transmission, a desired transmit power per carrier, and an actual spaced distance of the base station from the control center;

calculating an allowed spaced distance of the base station from the control center from said operating information, said calculated allowed spaced distance being a distance where sufficient operating power reaches the base station to permit the base station to transmit on the desired number of carriers at the desired transmit power per carrier;

comparing the actual spaced distance with the calculated allowed spaced distance; and reducing the desired number of carriers to be utilized by the base station for transmission at the desired transmit power per carrier if the actual spaced distance is greater than the calculated allowed spaced distance.

8. In a wireless communication system including a base station capable of transmitting signals on a select number of carriers at a select transmit power per carrier, said base station receiving a DC operating voltage from a control center located a spaced distance therefrom, a method of automatically controlling the number of carriers utilized by the base station during transmission, said method comprising the steps of:

continuously monitoring the DC operating voltage input to the base station;

calculating an allowed number of carriers operable at the select transmit power per carrier based on the monitored DC operating voltage; and ordering the base station to transmit on a reduced number of carriers at the select transmit power per carrier, said reduced number of carriers less than said calculated allowed number of carriers.

9. The method of claim 8, wherein the DC operating voltage is supplied by a battery in the control center.

10. The method of claim 8, further comprising the steps of:

first determining if the control center is operating in a battery backup mode; and performing the steps recited in claim 8 only if it is determined that the control center is operating in a battery backup mode.

11. In a wireless communication system including a control center supplying operating power to a plurality of base stations located at spaced distances therefrom, each base station capable of transmitting signals on a select number of carriers at a select transmit power per carrier, an improved base station comprising:

a controller automatically controlling the number of carriers utilized by the improved base station during transmission, said controller receiving operating information associated with the improved base station from the control center, said operating information including a desired number of carriers to be utilized by the improved base station for transmission, a desired transmit power per carrier, and an actual spaced distance of the improved base station from the control center, calculating an allowed spaced distance of the improved base station from the control center from said operating information, said calculated allowed spaced distance being a distance where sufficient operating power reaches the improved base station to permit the improved base station to transmit on the desired number of carriers at the desired transmit power per carrier, comparing the actual spaced distance with the calculated allowed spaced distance, activating the desired number of base station carriers at the desired transmit power per carrier if the actual spaced distance is less than, or equal to, the calculated allowed spaced distance, and activating a reduced number of base station carriers at the desired transmit power per carrier if the actual spaced distance is greater than the calculated allowed spaced distance, said reduced number of base station carriers being less than said desired number of base station carriers.

12. The improved base station of claim 11, wherein the controller downloads the operating information associated with the improved base station from the control center at base station power-up.

13. The improved base station of claim 11, wherein the desired number of base station carriers is a maximum number of carriers utilizable by the improved base station for transmission.

14. The improved base station of claim 11, wherein the desired transmit power per carrier is a maximum transmit power per carrier utilizable by the improved base station for transmission.

15. The improved base station of claim 11, wherein the operating power is supplied to the improved base station from the control center via a cable connecting the improved base station and the control center, and wherein operating power attenuation results from power dissipation in the cable.

16. In a wireless communication system including a control center supplying operating power to a plurality of base stations located at spaced distances therefrom, each base station capable of transmitting signals on a select number of carriers at a select transmit power per carrier, an improved base station comprising:

a controller automatically controlling the number of carriers utilized by the improved base station during transmission, said controller receiving operating information associated with the improved base station from the control center, said operating information including a desired number of carriers to be utilized by the improved base station for transmission, a desired transmit power per carrier, and an actual spaced distance of the improved base station from the control center, calculating an allowed spaced distance of the improved base station from the control center from said operating information, said calculated allowed spaced distance being a distance where sufficient operating power reaches the improved base station to permit the improved base station to transmit on the desired number of carriers at the desired transmit power per carrier, comparing the actual spaced distance with the calculated allowed spaced distance, and reducing the number of desired base station carriers utilized by the improved base station for transmission at the desired transmit power per carrier if the actual spaced distance is greater than the calculated allowed spaced distance.

17. In a wireless communication system including a control center supplying a DC operating voltage to a plurality of base stations located at spaced distances therefrom, each base station capable of transmitting signals on a select number of carriers at a select transmit power per carrier, an improved base station comprising:

a controller for automatically controlling the number of carriers utilized by the improved base station during transmission, said controller continuously monitoring the DC operating voltage input to the improved base station, calculating an allowed number of carriers operable at the select transmit power per carrier based on the monitored DC operating voltage, and ordering the improved base station to transmit on a reduced number of carriers at the select transmit power per carrier, said reduced number of carriers less than said calculated allowed number of carriers.

18. The improved base station of claim 17, wherein the DC operating voltage is supplied by a battery in the control center.

* * * * *